United States Patent [19]
Kromanaker

[11] 3,854,448
[45] Dec. 17, 1974

[54] TIRE PROTECTOR

[76] Inventor: Dennis P. Kromanaker, 439 Cascoigne Dr., Waukesha, Wis. 53186

[22] Filed: Dec. 5, 1973

[21] Appl. No.: 422,531

[52] U.S. Cl. .............................................. 118/505
[51] Int. Cl. ............................................ B05c 11/00
[58] Field of Search ...... 118/504, 505, 301; 117/38; 51/310–312

[56] References Cited
UNITED STATES PATENTS

| | | | |
|---|---|---|---|
| 1,843,432 | 2/1932 | Nickerson | 118/504 UX |
| 2,227,453 | 1/1941 | Koch | 118/505 |
| 2,996,041 | 8/1961 | Carpenter et al. | 118/505 |
| 3,001,509 | 9/1961 | Carpenter et al. | 118/505 |
| 3,141,794 | 7/1964 | Horner | 118/505 |
| 3,752,304 | 8/1973 | Alet | 118/505 X |

*Primary Examiner*—Morris Kaplan

[57] ABSTRACT

A tire protector intended for use as a painting shield and adapted to be applied to a vehicle tire when the wheels or rims thereof are being painted, the protector being in the form of a disposable paper or cardboard product of a circular shape having tire tread engaging portions projecting outwardly from the peripheral edges thereof for securing the protector thereto. The protector is provided with concentric circular perforations adapted to be readily punched out from the body of the protector so as to accomodate various sizes of tire inner diameters to expose the wheel or rim for painting. The protector further provided with a series of angularly spaced apart radially extending slits or perforations to permit the protector to accomodate the contours of the base of the tire onto which it is to be applied. Still further, the surface of the protector adjacent the surface of the tire is provided with double-sided pressure sensitive adhesive tape for retaining the protector to the face of the tire.

4 Claims, 5 Drawing Figures

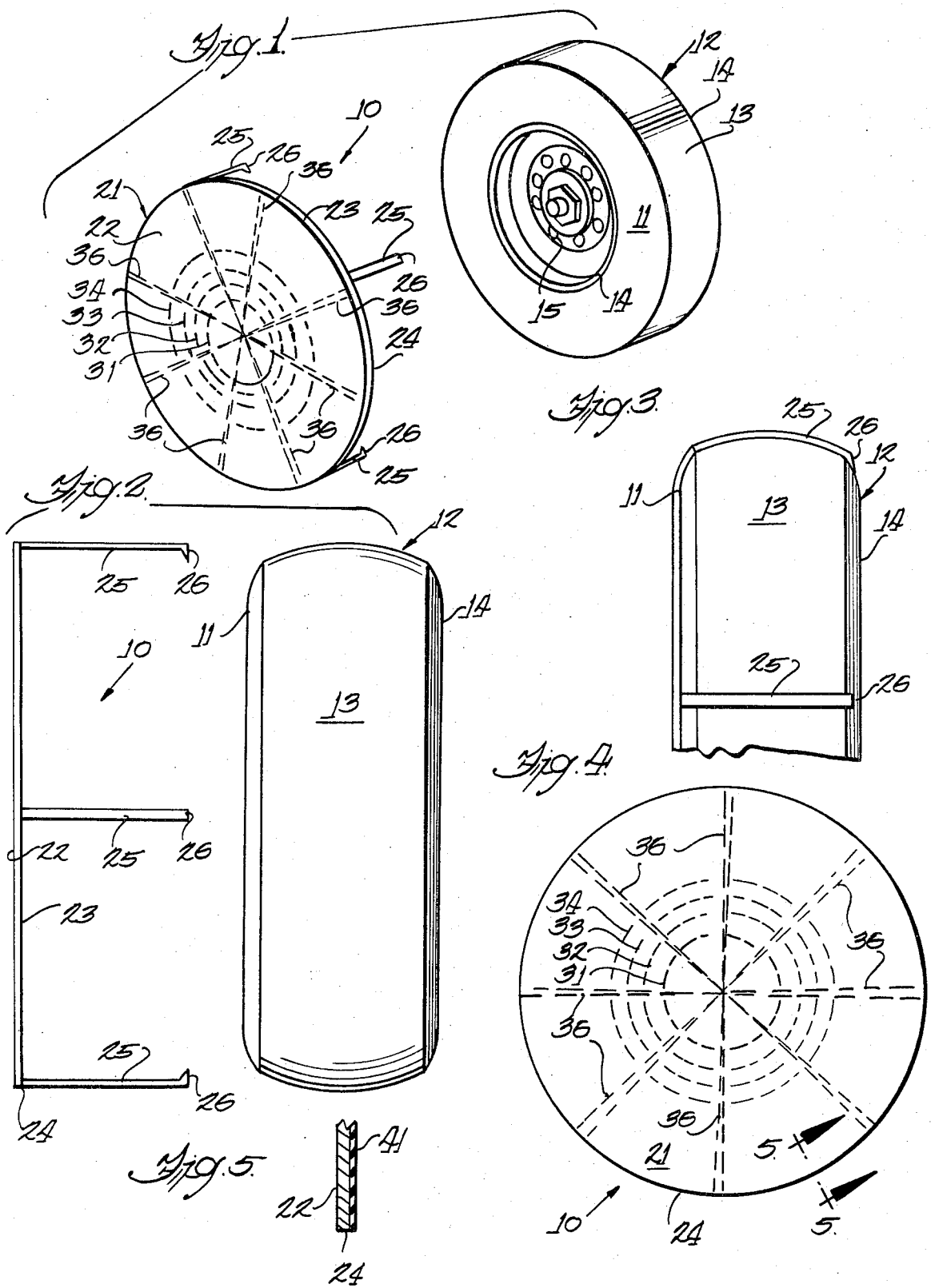

TIRE PROTECTOR

BACKGROUND OF THE INVENTION

1. Field of the Invention

This invention relates generally to vehicle tires and more particularly to a novel tire protector defining a painting shield adapted to be applied to the face surface of a tire in a manner to expose the central rim or wheel of the tire such that the rim or wheel may be painted without any paint marring the appearance of the face wall of the tire.

2. Description of the Prior Art

Ornamentation of the wheels and rims of vehicles is an important addition to the attractive overall aesthetic appearance of a vehicle and as such it is not unusual to paint the wheels and rims in matching or contrasting colors to the color of the vehicle in order to dress-up the wheels. Further, due to wear and tear on the wheel rims due to abuse thereof caused by road dirt, stones and the like, it is frequently necessary to repaint the wheel or rim so as to maintain the attractive appearance thereof.

It is presently required that when repainting the wheel or rim, the adjacent face surface of the tire be sufficiently masked by the use of paper or cloth improvised to cover the tire during the painting process, such being randomly taped to the tire so that no paint will mar the tire when the wheel is being painted. However, this is a time consuming and tedious chore which, if improperly performed, will not fully protect the tire against the paint being sprayed onto the wheel.

SUMMARY OF THE INVENTION

The present invention recognizes the problems in the painting of wheels and rims of vehicle tires and provides a novel solution thereto which overcomes all of the deficiencies and disadvantages of presently used make-shift painting shields in that the present invention provides a novel tire protector painting shield readily adapted to be fitted onto various sizes of tires to protect the same while permitting ease of painting the wheel and rim of the tire without getting paint on the tire.

It is a feature of the present invention to provide a disposable cardboard or paper product intended for temporary application to the face surface of a vehicle tire in a manner to protect the same while painting the wheel and rim of the tire.

It is a further feature of the present invention to provide a circular tire protector having members projecting from the peripheral edges thereof and adapted to engage the tread portion of the tire to retain the protector thereto, and having circular disposed perforations defining concentric circles which are readily removed from the protector to define an opening centrally thereof of a size adapted to fit about the wheel rim such that the protector overlies the complete tire face surface with the wheel and wheel rim exposed for painting.

The provision of a tire protector which is relatively simple in its construction and which therefore may be readily manufactured at a relatively low cost and by simple manufacturing methods; one which is disposable after use; one which is devoid of moving parts and which therefore always is prepared for usage; one which is easy to use and reliable and efficient in operation; and one which, otherwise, is well adapted to perform the services required of it, are further desirable features and advantages which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is an exploded perspective view of a tire protector constructed in accordance with the present invention preparatory to its being detachably secured to a tire;

FIG. 2 is a side elevational view of the tire protector relative to the tire onto which it is to be applied;

FIG. 3 is a fragmentary side elevational view of a tire having the protector applied thereto;

FIG. 4 is a front elevational view of the tire protector; and

FIG. 5 is an enlarged cross-sectional view taken along Line 5—5 of FIG. 4 illustrating the double-sided pressure sensitive adhesive tape secured to the back surface thereof.

DESCRIPTION OF THE PREFERRED EMBODIMENT

Referring now to the drawings in detail there is disclosed a preferred form of a tire protector constructed in accordance with the principles of the present invention and designated generally in its entirety by the reference numeral 10, the tire protector adapted to be applied to the face surface 11 of a tire 12 having a tread portion 13 and which is mounted on a rim 14 of a vehicle wheel 15. The tire protector 10 is preferably manufactured of heavy paper or cardboard and is disposable after use.

The tire protector includes a substantially flat circular disc shaped body 21 having a front surface 22, a back surface 23 and a circular peripheral edge 24. A plurality of circumferally spaced about support members 25 are disposed about edge 24 and project outwardly normal to back surface 23 with each member terminating in a radially inwardly projecting terminal end portion 26.

Disposed in ever increasing diameters concentric with the body 21 are a plurality of different diameter markings 31–34 formed concentric with the body and defined by perforations extending partially through the body, the selected diameter being punched through to provide an opening in the tire protector 10 centrally thereof of a size adapted to fit about the rim 14 of the tire 12. In this manner different sized tires having different sized rims may be accomodated by the tire protector 10.

Further, the body 21 is provided with a plurality of angularly spaced apart radially extending perforations or slits 36 permitting the body to accomodate the contour of the face surface 11 of the tire when applied thereto. As seen in FIG. 5, the back surface 23 of the body 21 is provided with a double-sided pressure sensitive adhesive tape 41 adapted to engage the tire front surface 11 to retain the protector 10 in juxtaposition therewith. Alternatively, it is to be understood that the back surface 23 of body member 21 may be coated with a pressure sensitive adhesive having a protective paper layer thereover such that the paper layer may be removed from the protector just prior to its use with the adhesive coating serving to detachably secure the protector to the front tire surface 11 in the manner as previously described.

In operation, a selected one of the perforation defined holes 31–34 are punched out from the body 21 of the protector, such being selected to accomodate the rim 14 so as to not cover such rim or the wheel 15, after which the protector is aligned with the face surface 11 of the wheel 12 and then axially pressed thereonto such that support members 25 pass about tread portion 13 with terminal hook ends 26 engaging the back surface 14 of the tire 12 and with body back surface 23 in juxtaposition with tire front surface 11, after which the body 21 is pressed against the tire face surface to follow the contours thereof with the perforations 36 permitting slitting of the body member where necessary to follow the contour of the tire, and with the adhesive 41 retaining the protector in the selected position. The wheel 15 and rim 14 may then be spray painted in the normal manner, after which the protector 10 is removed from the tire 12 and disposed of after its use.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A tire protector intended to provide a painting shield over the face surface of a tire about the wheel and wheel rim to permit painting of the wheel and rim without paint marring the appearance of the tire surface, the protector comprising a substantially flat circular disc shaped body member having a front surface, a back surface, and a peripheral circular edge surface, a plurality of different diameter concentric circles formed concentrically with said body member and defined by perforations extending partially through said body member and adapted for removal of an inner portion of said shield whereby to conform said shield to the inner diameter of the tire and whereby to permit painting of said wheel and rim, and a plurality of angularly spaced apart radially extending lines disposed in said body and defined by perforations extending partially through said body, said lines extending radially from the axis of said body to said outer edge thereof and adapted to permit radial separation of adjacent segments of said body for shaping said body to the contours of said tire face surface when applying said protector thereto, and means for detachably securing said protector to said tire about said tire about said wheel and rim.

2. The tire protector as set forth in claim 1 wherein said means for securing said protector to said tire comprises a pressure sensitive adhesive means secured to said back surface of said body member and adapted to secure said body member in juxtaposition with said tire face surface when said body member is applied thereto.

3. The tire protector as set forth in claim 2 further comprising a plurality of support members each disposed at spaced apart locations about the circumferal edge of said body member, each support member having one end connected to said body member with the support member projecting outwardly therefrom in an axial direction, each of said support members terminating in a hook like member adapted to engage a portion of the back surface of said tire with each support member engaging a tread portion of said tire, said support members and hook members assisting in detachably securing said body member to said tire.

4. The tire protector as set forth in claim 3 wherein the body member is made of cardboard.

* * * * *